(12) United States Patent
Kwon et al.

(10) Patent No.: US 10,274,058 B2
(45) Date of Patent: Apr. 30, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Hyun Sik Kwon, Seoul (KR); Seongwook Ji, Gyeonggi-do (KR); Ki Tae Kim, Incheon (KR); Juhyeon Park, Gyeonggi-do (KR); Ilhan Yoo, Gyeonggi-do (KR); Seong Wook Hwang, Gyeonggi-do (KR); Wonmin Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 17 days.

(21) Appl. No.: 15/823,830

(22) Filed: Nov. 28, 2017

(65) Prior Publication Data

US 2019/0063558 A1    Feb. 28, 2019

(30) Foreign Application Priority Data

Aug. 30, 2017    (KR) .................. 10-2017-0110177

(51) Int. Cl.
*F16H 3/66*    (2006.01)
*F16H 3/62*    (2006.01)

(52) U.S. Cl.
CPC .............. *F16H 3/66* (2013.01); *F16H 3/62* (2013.01); *F16H 2200/0069* (2013.01); *F16H 2200/2012* (2013.01); *F16H 2200/2046* (2013.01)

(58) Field of Classification Search
CPC ...... F16H 3/62; F16H 3/66; F16H 2200/0069; F16H 2200/2012; F16H 2200/2046
USPC ......................................... 475/271, 280, 282
See application file for complete search history.

(56) References Cited

U.S. PATENT DOCUMENTS

| 7,364,527 B2* | 4/2008 | Klemen ................. F16H 3/66 475/280 |
| 7,575,532 B2* | 8/2009 | Raghavan ............... F16H 3/666 475/280 |
| 7,736,262 B2* | 6/2010 | Suh ......................... F16H 3/66 475/276 |
| 8,403,803 B2* | 3/2013 | Gumpoltsberger ....... F16H 3/66 475/276 |

(Continued)

*Primary Examiner* — Leslie A Nicholson, III
(74) *Attorney, Agent, or Firm* — Mintz Levin Cohn Ferris Glovsky and Popeo, P.C.; Peter F. Corless

(57) ABSTRACT

A planetary gear train is provided. The gear train includes input and output shafts and first to fourth planetary gear sets that respectively have first to third, fourth to sixth, seventh to ninth, and tenth to twelfth elements. A first shaft is connected with the first and fourth elements and selectively connected with the input shaft, a second shaft is connected with the sixth element and selectively connected with the input shaft, a third shaft is connected with the eighth element and the output shaft, a fourth shaft is connected with the second, fifth, and ninth elements, and a fifth shaft is connected with the third and eleventh elements. A plurality of shafts are each selectively connected to the transmission housing and connected to an element of the third and fourth planetary gear sets that is not connected with any of the first to seventh shafts.

13 Claims, 2 Drawing Sheets

(56) References Cited

U.S. PATENT DOCUMENTS

| | | | | |
|---|---|---|---|---|
| 8,414,446 B2* | 4/2013 | Beck | F16H 3/66 | 475/277 |
| 8,444,524 B2* | 5/2013 | Gumpoltsberger | F16H 3/66 | 475/276 |
| 8,506,443 B2* | 8/2013 | Seo | F16H 3/66 | 475/280 |
| 8,597,152 B2* | 12/2013 | Seo | F16H 3/66 | 475/276 |
| 8,636,617 B2* | 1/2014 | Singh | F16H 3/66 | 475/275 |
| 8,920,281 B2* | 12/2014 | Mellet | F16H 3/66 | 475/278 |
| 9,377,086 B2* | 6/2016 | Beck | F16H 3/66 | |
| 9,435,405 B2* | 9/2016 | Etchason | F16H 3/62 | |
| 9,593,746 B2* | 3/2017 | Cho | F16H 3/66 | |
| 9,599,195 B2* | 3/2017 | Beck | F16H 3/66 | |
| 9,599,197 B1* | 3/2017 | Park | F16H 3/66 | |
| 9,822,852 B2* | 11/2017 | Ji | F16H 3/66 | |
| 9,845,847 B2* | 12/2017 | Kook | F16H 3/666 | |
| 9,863,507 B2* | 1/2018 | Cho | F16H 3/66 | |
| 9,897,172 B2* | 2/2018 | Kook | F16H 3/66 | |
| 9,933,045 B1* | 4/2018 | Horen | F16H 3/66 | |
| 10,041,569 B2* | 8/2018 | Hwang | F16H 3/66 | |
| 10,047,831 B2* | 8/2018 | Kook | F16H 3/666 | |
| 10,047,834 B2* | 8/2018 | Kook | F16H 3/66 | |
| 10,072,735 B2* | 9/2018 | Crafton | F16H 3/66 | |
| 2018/0087610 A1* | 3/2018 | Tryon | F16H 3/66 | |

* cited by examiner

FIG. 2

| Shift-stage | Engagement element | | | | | | Gear ratio |
|---|---|---|---|---|---|---|---|
| | C1 | C2 | C3 | C4 | B1 | B2 | |
| D1 | ● | | | | ● | ● | 4.777 |
| D2 | ● | | | ● | ● | | 3.410 |
| D3 | ● | | ● | | ● | | 2.695 |
| D4 | ● | ● | | | ● | | 1.769 |
| D5 | | ● | ● | | ● | | 1.384 |
| D6 | | ● | | ● | ● | | 1.086 |
| D7 | ● | ● | | ● | | | 1.000 |
| D8 | | ● | | ● | | ● | 0.889 |
| D9 | | ● | ● | | | ● | 0.774 |
| D10 | ● | ● | | | | ● | 0.734 |
| D11 | | ● | | | ● | ● | 0.516 |
| REV | ● | | | ● | | ● | -2.133 |

PLANETARY GEAR TRAIN OF AUTOMATIC TRANSMISSION FOR VEHICLE

CROSS-REFERENCE TO RELATED APPLICATION

This application claims priority to and the benefit of Korean Patent Application No. 10-2017-0110177 filed on Aug. 30, 2017, the entire contents of which are incorporated herein by reference.

BACKGROUND

Field of the Invention

The present invention relates to an automatic transmission for a vehicle, and more particularly, to an automatic transmission for a vehicle that enables at least ten forward speeds.

Description of the Related Art

Recently, research regarding increasing shift-stages of an automatic transmission has been conducted to enhance fuel consumption and improve drivability. Additionally, an increase of oil price is triggering competition in enhancing fuel consumption of a vehicle. Accordingly, engine research has been conducted to reduce overall weight thereof and to enhance fuel consumption by downsizing research regarding an automatic transmission has been performed to simultaneously improve drivability and fuel consumption by achieving more shift stages.

To achieve more shift stages for an automatic transmission, the number of parts is typically increased, which may deteriorate installability, production cost, weight and/or power flow efficiency. Therefore, to maximally enhance fuel consumption of an automatic transmission having more shift stages, it is important for better efficiency to be derived by a minimal number of parts.

In this respect, an eight-speed automatic transmission has recently been introduced, and a planetary gear train for an automatic transmission enabling more shift stages is being researched. An automatic transmission of eight or more shift-stages typically includes three to four planetary gear sets and five to seven engagement elements (frictional elements), and thus may become lengthy, thereby deteriorating installability. In this regard, disposing planetary gear sets in parallel or employing dog clutches instead of wet-type control elements has been implemented. However, such an arrangement may not be widely applicable, and using dog clutches may deteriorate shift-feel for a driver.

The above information disclosed in this section is merely for enhancement of understanding of the background of the invention and therefore it may contain information that does not form the prior art that is already known in this country to a person of ordinary skill in the art.

SUMMARY

The present disclosure relates to a planetary gear train of an automatic transmission for a vehicle enabling at least ten forward speeds, thereby providing improved performance and fuel efficiency of a vehicle.

A planetary gear train according to an exemplary embodiment may include an input shaft configured to receive an engine torque, an output shaft configured to output a shifted torque, a first planetary gear set having first, second, and third rotational elements, a second planetary gear set having fourth, fifth, and sixth rotational elements, a third planetary gear set having seventh, eighth, and ninth rotational elements, and a fourth planetary gear set having tenth, eleventh, and twelfth rotational elements.

An exemplary planetary gear train may further include a first shaft fixedly connected with the first rotational element and the fourth rotational element and selectively connected with the input shaft, a second shaft fixedly connected with the sixth rotational element and selectively connected with the input shaft, a third shaft fixedly connected with the eighth rotational element and fixedly connected with the output shaft, a fourth shaft fixedly connected with the second rotational element, the fifth rotational element, and the ninth rotational element, a fifth shaft fixedly connected with the third rotational element and the eleventh rotational element, and a plurality of shafts each of which may be selectively connected to the transmission housing and fixedly connected to a rotational element of the third and fourth planetary gear sets that is not fixedly connected with any of the first to seventh shafts.

The plurality of shafts may include a sixth shaft fixedly connected with the seventh rotational element and the twelfth rotational element and selectively connected with the transmission housing, and a seventh shaft fixedly connected with the tenth rotational element and selectively connected with the transmission housing. The input shaft and the first shaft, the input shaft and the second shaft, the first shaft and the seventh shaft, and the fourth shaft and the seventh shaft may be selectively interconnected with each other, respectively. The exemplary planetary gear train may further include four clutches that each selectively connects a corresponding pair among the input shaft, the output shaft, and the first to seventh shafts, and two brakes that selectively connect the sixth shaft and the seventh shaft to the transmission housing, respectively.

The four clutches may include a first clutch disposed between the input shaft and the first shaft, a second clutch disposed between the input shaft and the second shaft, a third clutch disposed between the first shaft and the seventh shaft, and a fourth clutch disposed between the fourth shaft and the seventh shaft. The two brakes may include a first brake disposed between the sixth shaft and the transmission housing, and a second brake disposed between the seventh shaft and the transmission housing.

The first planetary gear set may be a single pinion planetary gear set having a first sun gear, a first planet carrier, and a first ring gear as the first, second, and third rotational elements. The second planetary gear set may be a single pinion planetary gear set having a second sun gear, a second planet carrier, and a second ring gear as the fourth, fifth, and sixth rotational elements. The third planetary gear set may be a single pinion planetary gear set having a third sun gear, a third planet carrier, and a third ring gear as the seventh, eighth, and ninth rotational elements. The fourth planetary gear set may be a single pinion planetary gear set having a fourth sun gear, a fourth planet carrier, and a fourth ring gear as the tenth, eleventh, and twelfth rotational elements. The first, second, third, and fourth planetary gear sets may be arranged in the order of the first, fourth, third, and second planetary gear sets from an engine side.

According to an exemplary embodiment of the present invention, shift-stages of at least ten forward speeds and at least one reverse speed may be realized by combination of four planetary gear sets and six engagement elements. In addition, a planetary gear train according to an exemplary embodiment of the present invention may substantially improve driving stability by realizing shift-stages appropriate for rotation speed of an engine due to multi-stages of an automatic transmission.

In addition, a planetary gear train according to an exemplary embodiment of the present invention may maximize engine driving efficiency by multi-stages of an automatic transmission, and may improve power delivery performance and fuel consumption. Further, effects that may be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 2 is an operational chart for respective control elements at respective shift-stages applicable to a planetary gear train according to an exemplary embodiment of the present invention.

DETAILED DESCRIPTION

Figure 1:
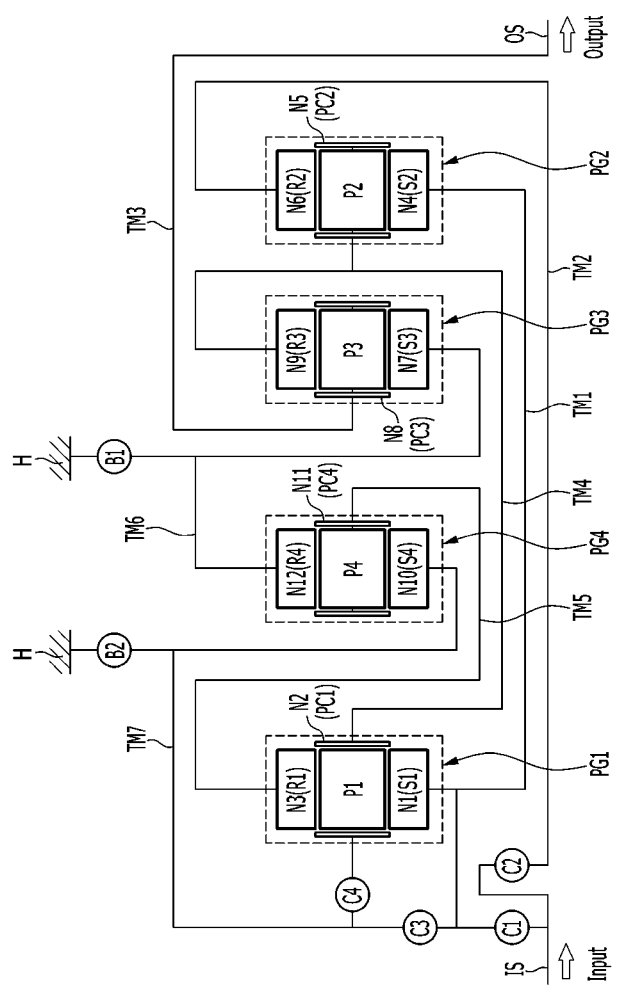
FIG. 1 is a schematic diagram of a planetary gear train according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Hereinafter, an exemplary embodiment of the present invention will be described in detail with reference to drawings. The drawings and description are to be regarded as illustrative in nature and not restrictive, and like reference numerals designate like elements throughout the specification. In the following description, dividing names of components into first, second, and the like is to divide the names because the names of the components are the same as each other and an order thereof is not particularly limited.

FIG. 1 is a schematic diagram of a planetary gear train according to an exemplary embodiment of the present invention. Referring to FIG. 1, a planetary gear train according to an exemplary embodiment of the present invention may include first, second, third, and fourth planetary gear sets PG1, PG2, PG3, and PG4 arranged on a same axis, an input shaft IS, an output shaft OS, seven shafts TM1 to TM7 that interconnect rotational elements of the first, second, third, and fourth planetary gear sets PG1, PG2, PG3, and PG4, engagement elements of four clutches C1 to C4 and two brakes B1 and B2, and a transmission housing H. Torque input from the input shaft IS may be shifted by cooperative operation of the first, second, third, and fourth planetary gear sets PG1, PG2, PG3, and PG4, and then output through the output shaft OS.

In an exemplary embodiment of the present invention, the planetary gear sets may be arranged in the order of the first, fourth, third, and the second planetary gear sets PG1, PG4, PG3, and PG2, from an engine side. The input shaft IS is an input member and may be configured to receive a torque from a crankshaft of an engine through a torque converter. The output shaft OS is an output member arranged on a same axis with the input shaft IS and may be configured to output a shifted driving torque to a driveshaft through a differential apparatus.

The first planetary gear set PG1 is a single pinion planetary gear set and may include a first sun gear S1, a first planet carrier PC1 that rotatably supports a plurality of first pinion gears P1 externally gear-meshed with the first sun gear S1, and a first ring gear R1 internally gear-meshed with the plurality of first pinion gears P1 engaged with the first sun gear S1. The first sun gear S1 may operate as a first rotational element N1, the first planet carrier PC1 may operate as a second rotational element N2, and the first ring gear R1 may operate as a third rotational element N3.

The second planetary gear set PG2 is a single pinion planetary gear set and may include a second sun gear S2, a second planet carrier PC2 that rotatably supports a plurality of second pinion gears P2 externally gear-meshed with the second sun gear S2, and a second ring gear R2 internally gear-meshed with the plurality of second pinion gears P2 engaged with the second sun gear S2. The second sun gear S2 may operate as a fourth rotational element N4, the second planet carrier PC2 may operate as a fifth rotational element N5, and the second ring gear R2 may operate as a sixth rotational element N6.

The third planetary gear set PG3 is a single pinion planetary gear set and may include a third sun gear S3, a third planet carrier PC3 that rotatably supports a plurality of third pinion gears P3 externally gear-meshed with the third sun gear S3, and a third ring gear R3 internally gear-meshed with the plurality of third pinion gears P3 engaged with the third sun gear S3. The third sun gear S3 may operate as a seventh rotational element N7, the third planet carrier PC3 may operate as an eighth rotational element N8, and the third ring gear R3 may operate as a ninth rotational element N9.

The fourth planetary gear set PG4 is a single pinion planetary gear set and may include a fourth sun gear S4, a fourth planet carrier PC4 that rotatably supports a plurality of fourth pinion gears P4 externally gear-meshed with the fourth sun gear S4, and a fourth ring gear R4 internally gear-meshed with the plurality of fourth pinion gears P4 engaged with the fourth sun gear S4. The fourth sun gear S4 may operate as tenth rotational element N10, the fourth planet carrier PC4 may operate as an eleventh rotational element N11, and the fourth ring gear R4 may operate as a twelfth rotational element N12

In the first, second, third, and fourth planetary gear sets PG1, PG2, PG3, and PG4, the first rotational element N1 may be fixedly connected with the fourth rotational element N4, the second rotational element N2 may be fixedly connected with the fifth rotational element N5 and the ninth rotational element N9, the third rotational element N3 may be fixedly connected with the eleventh rotational element N11, and the seventh rotational element N7 may be fixedly connected with the twelfth rotational element N12, to form seven shafts TM1 to TM7.

The seven shafts TM1 to TM7 are hereinafter described in detail. The first shaft TM1 may be fixedly connected with the first rotational element N1 (first sun gear S1) and the fourth rotational element N4 (second sun gear S2), and selectively connected with the input shaft IS to selectively operate as an input element. The second shaft TM2 may be fixedly connected with the sixth rotational element N6 (second ring gear R2), and selectively connected with the input shaft IS to selectively operate as an input element.

The third shaft TM3 may be fixedly connected with the eighth rotational element N8 (third planet carrier PC3), and fixedly connected with the output shaft OS to operate as an output element. The fourth shaft TM4 may be fixedly connected with the second rotational element N2 (first planet carrier PC1), the fifth rotational element N5 (second planet carrier PC2), and the ninth rotational element N9 (third ring gear R3).

The fifth shaft TM5 may be fixedly connected with the third rotational element N3 (first ring gear R1) and the eleventh rotational element N11 (fourth planet carrier PC4). The sixth shaft TM6 may be fixedly connected with the seventh rotational element N7 (third sun gear S3) and the twelfth rotational element N12 (fourth ring gear R4). The seventh shaft TM7 may be fixedly connected with the tenth rotational element N10 (fourth sun gear S4). Each of the seven shafts TM1 to TM7 may be a rotational member that fixedly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

In the present disclosure, when two or more members are described to be "fixedly connected", where the member may be any of a shaft, an input shaft, an output shaft, a rotational member, and a transmission housing, it means that the fixedly connected members always rotate at a same speed. Additionally, when two or more members are described to be "selectively connected" by an engagement element, it means that the selectively connected members rotates separately when the engagement element is not engaged, and rotates at a same speed when the engagement element is engaged. It may be understood that when a member is "selectively connected" with a transmission housing by an engagement element, the member may be stationary when the engagement element is engaged.

Furthermore, the first shaft TM1 may be selectively connected with the input shaft IS, the second shaft TM2 may be selectively connected with the input shaft IS, the first shaft TM1 may be selectively connected with the seventh shaft TM7, and the fourth shaft TM4 may be selectively connected with the seventh shaft TM7. The sixth shaft TM6 and the seventh shaft TM7 may be selectively connected with the transmission housing H, to selectively operate as fixed elements, respectively.

The engagement elements of four clutches C1, C2, C3, and C4 may be arranged between the seven shafts TM1 to TM7, the input shaft IS, and the output shaft OS, to form selective connections. The seven shafts TM1 to TM7 may be selectively connected with the transmission housing H, by control elements of two brakes B1 and B2. The six engagement elements of the four clutches C1 to C4 and the two brakes B1 and B2 may be arranged as follows.

The first clutch C1 may be disposed between the input shaft IS and the first shaft TM1, and may selectively connect the input shaft IS and the first shaft TM1 to control power delivery therebetween. The second clutch C2 may be disposed between the input shaft IS and the second shaft TM2, and may selectively connect the input shaft IS and the second shaft TM2 to control power delivery therebetween. The third clutch C3 may be disposed between the first shaft TM1 and the seventh shaft TM7, and may selectively connect the first shaft TM1 and the seventh shaft TM7 to control power delivery therebetween. The fourth clutch C4 may be disposed between the fourth shaft TM4 and the seventh shaft TM7, and may selectively connect the fourth shaft TM4 and the seventh shaft TM7 to control power delivery therebetween.

Additionally, the first brake B1 may be disposed between the sixth shaft TM6 and the transmission housing H, and may selectively connect the sixth shaft TM6 to the transmission housing H. The second brake B2 may be disposed between the seventh shaft TM7 and the transmission housing H, and may selectively connect the seventh shaft TM7 to the transmission housing H. The engagement elements of the first, second, third, and fourth clutches C1, C2, C3, and C4 and the first and second brakes B1 and B2 may be realized as multi-plate hydraulic pressure friction devices that are frictionally engaged by hydraulic pressure, however, it should not be understood to be limited thereto, since various other configuration that are electrically controllable may be available.

FIG. 2 is an operational chart for respective control elements at respective shift-stages applicable to a planetary gear train according to an exemplary embodiment of the present invention. Referring to FIG. 2, a planetary gear train according to an exemplary embodiment of the present invention realizes shifting between ten forward speeds and one reverse speed by operating three elements among the engagement elements of the first, second, third, and fourth clutches C1, C2, C3, and C4 and the first and second brakes B1 and B2.

In the forward first speed D1, the first clutch C1 and the first and second brakes B1 and B2 may be operated simultaneously. As a result, the first shaft TM1 may be connected with the input shaft IS by the operation of the first clutch C1, and an input torque may be input to the first shaft TM1. In addition, the sixth shaft TM6 and the seventh shaft TM7 may operate as fixed elements by the operation of the first and second brakes B1 and B2 to realize or reach the forward first speed and output a shifted torque to the output shaft OS connected with the third shaft TM3.

In the forward second speed D2, the first and fourth clutches C1 and C4 and the first brake B1 may be operated simultaneously. As a result, the first shaft TM1 may be connected with the input shaft IS by the operation of the first clutch C1, and the fourth shaft TM4 may be connected with the seventh shaft TM7 by the operation of the fourth clutch C4. In this state, the input torque may be input to the first shaft TM1. In addition, the sixth shaft TM6 may operate as a fixed element by the operation of the first brake B1 to realize or reach the forward second speed and output a shifted torque to the output shaft OS connected with the third shaft TM3.

In the forward third speed D3, the first and third clutches C1 and C3 and the first brake B1 may be operated simultaneously. As a result, the first shaft TM1 may be connected with the input shaft IS by the operation of the first clutch C1, and the first shaft TM1 may be connected with the seventh shaft TM7 by the operation of the third clutch C3. In this state, the input torque may be input to the first shaft TM1. The sixth shaft TM6 may operate as a fixed element by the operation of the first brake B1 to realize or reach the forward third speed and output a shifted torque to the output shaft OS connected with the third shaft TM3.

In the forward fourth speed D4, the first and second clutch C1 and C2 and the first brake B1 may be operated simultaneously. As a result, the first shaft TM1 may be connected with the input shaft IS by the operation of the first clutch C1, and the second shaft TM2 may be connected with the input shaft IS by the operation of the second clutch C2. In this state, an input torque may be input to the first shaft TM1 and the second shaft TM2. In addition, the sixth shaft TM6 may operate as a fixed element by the operation of the first brake B1 to realize or reach the forward fourth speed and output a shifted torque to the output shaft OS connected with the third shaft TM3.

In the forward fifth speed D5, the second and third clutches C2 and C3 and the first brake B1 may be operated simultaneously. As a result, the second shaft TM2 may be connected with the input shaft IS by the operation of the second clutch C2, and the first shaft TM1 may be connected with the seventh shaft TM7 by the operation of the third clutch C3. In this state, the input torque may be input to the second shaft TM2. The sixth shaft TM6 may operate as a fixed element by the operation of the first brake B1 to realize or reach the forward fifth speed and output a shifted torque to the output shaft OS connected with the third shaft TM3.

In the forward sixth speed D6, the second and fourth clutches C2 and C4 and the first brake B1 may be operated simultaneously. As a result, the second shaft TM2 may be connected with the input shaft IS by the operation of the second clutch C2, and the fourth shaft TM4 may be connected with the seventh shaft TM7 by the operation of the fourth clutch C4. In this state, the input torque may be input to the second shaft TM2. In addition, the sixth shaft TM6 may operate as a fixed element by the operation of the first brake B1 to realize or reach the forward sixth speed and output a shifted torque to the output shaft OS connected with the third shaft TM3.

In the forward seventh speed D7, the first, second, and fourth clutches C1, C2, and C4 may be operated simultaneously. As a result, the first shaft TM1 may be connected with the input shaft IS by the operation of the first clutch C1, the second shaft TM2 may be connected with the input shaft IS by the operation of the second clutch C2, and the fourth shaft TM4 may be connected with the seventh shaft TM7 by the operation of the fourth clutch C4.

Further, the first, second, third, and fourth planetary gear sets PG1, PG2, PG3, and PG4 may then rotate integrally, and a torque may be input to the first shaft TM1 and the second shaft TM2 to realize or reach the forward seventh speed where a torque may be output as input, and to output a shifted torque to the output shaft OS connected with the third shaft TM3.

In the forward eighth speed D8, the first and fourth clutches C1 and C4 and the second brake B2 may be operated simultaneously. As a result, the first shaft TM1 may be connected with the input shaft IS by the operation of the first clutch C1, and the fourth shaft TM4 may be connected with the seventh shaft TM7 by the operation of the fourth clutch C4. In this state, the input torque may be input to the first shaft TM1. In addition, the seventh shaft TM7 may operate as a fixed element by the operation of the second brake B2 to realize or reach the forward eighth speed and output a shifted torque to the output shaft OS connected with the third shaft TM2.

In the forward ninth speed D9, the first and third clutches C1 and C3 and the second brake B2 may be operated simultaneously. As a result, the first shaft TM1 may be connected with the input shaft IS by the operation of the first clutch C1, and the first shaft TM1 may be connected with the seventh shaft TM7 by the operation of the third clutch C3. In this state, the input torque may be input to the first shaft TM1. In addition, the seventh shaft TM7 may operate as a fixed element by the operation of the second brake B2 to realize or reach the forward ninth speed and output a shifted torque to the output shaft OS connected with the third shaft TM2.

In the forward tenth speed D10, the first and second clutch C1 and C2 and the second brake B2 may be operated simultaneously. As a result, the first shaft TM1 and the second shaft TM2 may be connected with the input shaft IS by the operation of the first and second clutch C1 and C2. In this state, a torque may be input to the first shaft TM1 and the second shaft TM2. In addition, the seventh shaft TM7 may operate as a fixed element by the operation of the second brake B2 to realize or reach the forward tenth speed and output a shifted torque to the output shaft OS connected with the third shaft TM3.

In the reverse speed REV, the first and fourth clutches C1 and C4 and the second brake B2 may be operated simultaneously. As a result, the first shaft TM1 may be connected with the input shaft IS by the operation of the first clutch C1, and the fourth shaft TM4 may be connected with the seventh shaft TM7 by the operation of the fourth clutch C4. In this state, the input torque may be input to the first shaft TM1. In addition, the seventh shaft TM7 may operate as a fixed element by the operation of the second brake B2 to realize the reverse speed and output a shifted torque to the output shaft OS connected with the third shaft TM3.

As described above, a planetary gear train according to an exemplary embodiment of the present invention may realize ten forward speeds and one reverse speed by operating the four planetary gear sets PG1, PG2, PG3, and PG4 by controlling the four clutches C1, C2, C3, and C4 and the two brakes B1 and B2. In addition, a planetary gear train according to an exemplary embodiment of the present invention may substantially improve driving stability by realizing shift-stages appropriate for rotation speed of an engine due to multi-stages of an automatic transmission. In addition, a planetary gear train according to an exemplary embodiment of the present invention may maximize engine driving efficiency by multi-stages of an automatic transmission, and may improve power delivery performance and fuel consumption.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

B1, B2: first and second brakes
C1, C2, C3, C4: first, second, third, and fourth clutches
PG1, PG2, PG3, PG4: first, second, third, and fourth planetary gear sets
S1, S2, S3, S4: first, second, third, and fourth sun gears
PC1, PC2, PC3, PC4: first, second, third, and fourth planet carriers
R1, R2, R3, R4: first, second, third, and fourth ring gears
IS: input shaft
OS: output shaft
TM1, TM2, TM3, TM4, TM5, TM6, TM7: first, second, third, fourth, fifth, sixth, and seventh shafts

What is claimed is:

1. A planetary gear train of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements;
a first shaft fixedly connected with the first rotational element and the fourth rotational element and selectively connected with the input shaft;
a second shaft fixedly connected with the sixth rotational element and selectively connected with the input shaft;
a third shaft fixedly connected with the eighth rotational element and fixedly connected with the output shaft;
a fourth shaft fixedly connected with the second rotational element, the fifth rotational element, and the ninth rotational element;
a fifth shaft fixedly connected with the third rotational element and the eleventh rotational element; and
a plurality of shafts each of which is selectively connected to the transmission housing and fixedly connected to a rotational element of the third and fourth planetary gear sets that is not fixedly connected with any of the first to seventh shafts.

2. The planetary gear train of claim 1, wherein the plurality of shafts includes:
a sixth shaft fixedly connected with the seventh rotational element and the twelfth rotational element and selectively connected with the transmission housing; and
a seventh shaft fixedly connected with the tenth rotational element and selectively connected with the transmission housing,
wherein the input shaft and the first shaft, the input shaft and the second shaft, the first shaft and the seventh shaft, and the fourth shaft and the seventh shaft are selectively interconnected with each other, respectively.

3. The planetary gear train of claim 2, further comprising:
four clutches each that selectively connect a corresponding pair among the input shaft, the output shaft, and the first to seventh shafts; and
two brakes that selectively connect the sixth shaft and the seventh shaft to the transmission housing respectively.

4. The planetary gear train of claim 3, wherein the four clutches include:
a first clutch disposed between the input shaft and the first shaft;
a second clutch disposed between the input shaft and the second shaft;
a third clutch disposed between the first shaft and the seventh shaft; and
a fourth clutch disposed between the fourth shaft and the seventh shaft.

5. The planetary gear train of claim 4, wherein the two brakes include:
a first brake disposed between the sixth shaft and the transmission housing; and
a second brake disposed between the seventh shaft and the transmission housing.

6. The planetary gear train of claim 1, wherein,
the first planetary gear set is a single pinion planetary gear set having a first sun gear, a first planet carrier, and a first ring gear as the first, second, and third rotational elements,
the second planetary gear set is a single pinion planetary gear set having a second sun gear, a second planet carrier, and a second ring gear as the fourth, fifth, and sixth rotational elements,
the third planetary gear set is a single pinion planetary gear set having a third sun gear, a third planet carrier, and a third ring gear as the seventh, eighth, and ninth rotational elements, and
the fourth planetary gear set is a single pinion planetary gear set having a fourth sun gear, a fourth planet carrier, and a fourth ring gear as the tenth, eleventh, and twelfth rotational elements.

7. The planetary gear train of claim 1, wherein the first, second, third, and fourth planetary gear sets are arranged in the order of the first, fourth, third, and second planetary gear sets from an engine side.

8. A planetary gear train of an automatic transmission for a vehicle, comprising:
an input shaft configured to receive an engine torque;
an output shaft configured to output a shifted torque;
a first planetary gear set having first, second, and third rotational elements;
a second planetary gear set having fourth, fifth, and sixth rotational elements;
a third planetary gear set having seventh, eighth, and ninth rotational elements;
a fourth planetary gear set having tenth, eleventh, and twelfth rotational elements,
wherein the first rotational element is fixedly connected with the fourth rotational element, and selectively connected with the input shaft,
the second rotational element is fixedly connected with the fifth rotational element and the ninth rotational element,
the third rotational element is fixedly connected with the eleventh rotational element,
the sixth fixed element is selectively connected with the input shaft,
the seventh rotational element is fixedly connected with the twelfth rotational element, and selectively connected with the transmission housing,
the eighth rotational element is fixedly connected with the output shaft,
the tenth rotational element is selectively connected with the first rotational element and the second rotational element.

9. The planetary gear train of claim 8, further comprising:
four clutches that each selectively connect a corresponding pair among the input shaft, the output shaft, and the rotational elements; and
two brakes that selectively connect the seventh rotational element and the tenth rotational element to the transmission housing respectively.

10. The planetary gear train of claim 9, wherein the four clutches include:
a first clutch disposed between the input shaft and the first rotational element;
a second clutch disposed between the input shaft and the sixth rotational element;
a third clutch disposed between the first rotational element and the tenth rotational element;
a fourth clutch disposed between the second rotational element and the tenth rotational element.

11. The planetary gear train of claim 10, wherein the two brakes include:
a first brake disposed between the seventh rotational element and the transmission housing; and
a second brake disposed between the tenth rotational element and the transmission housing.

12. The planetary gear train of claim 8, wherein:
the first planetary gear set is a single pinion planetary gear set having a first sun gear, a first planet carrier, and a first ring gear as the first, second, and third rotational elements,
the second planetary gear set is a single pinion planetary gear set having a second sun gear, a second planet carrier, and a second ring gear as the fourth, fifth, and sixth rotational elements,
the third planetary gear set is a single pinion planetary gear set having a third sun gear, a third planet carrier, and a third ring gear as the seventh, eighth, and ninth rotational elements, and
the fourth planetary gear set is a single pinion planetary gear set having a fourth sun gear, a fourth planet carrier, and a fourth ring gear as the tenth, eleventh, and twelfth rotational elements.

13. The planetary gear train of claim 8, wherein the first, second, third, and fourth planetary gear sets are arranged in the order of the first, fourth, third, and second planetary gear sets from an engine side.

* * * * *